351-69
BEST AVAILABLE COPY
10
G. N. Cummings,
Eye Glass.
No. 2908.
Reissued Mar. 31. 1868
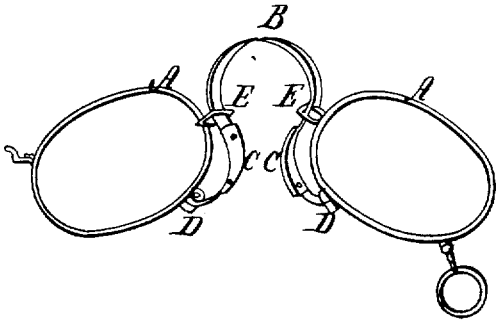
Witnesses;
Geo. W. Maxwell.
Robert W. Jenks.
Inventor;
G. N. Cummings
N. PETERS, PHOTO-LITHOGRAPHER, WASHINGTON, D. C.

BEST AVAILABLE COPY

United States Patent Office.

CHARLES PARKER, OF MERIDEN, CONNECTICUT, ASSIGNEE OF GEORGE N. CUMMINGS, OF PROVIDENCE, RHODE ISLAND.

*Letters Patent No.* 67,176, *dated July* 30, 1867; *reissue No.* 2,908, *dated March* 31, 1868.

IMPROVEMENT IN EYE-GLASSES.

The Schedule referred to in these Letters Patent and making part of the same.

TO ALL WHOM IT MAY CONCERN:

Be it known that GEORGE N. CUMMINGS, of Providence, in the county of Providence, and State of Rhode Island, invented a new Improvement in Eye-Glasses; and I do hereby declare the following, when taken in connection with the accompanying drawing, and the letters of reference marked thereon, to be a full, clear, and exact description of the same, and which said drawing constitutes part of this specification, and represents a perspective view of the glasses open.

This invention relates to an improvement in that class of eye-glasses which are held upon the nose by means of a spring, the said spring being the connection between the two glasses, the object being to relieve the nose from the strong pressure occasioned by the usual short connection of the spring between the two glasses, as also to spread the glasses, so that the centre of each glass will come into position nearer the centre of the eye; and my invention consists, first, in securing each end of the spring to its respective bow, by forming the joint in each bow at a point below the bearing-point upon the nose, and inserting the end of the spring between the two parts of each of the said joints, then securing the joints by a screw, or its equivalent, passing through the two parts of the joints and spring, thus securely clamping the spring to the bow, and so that, in case of injury, it may be easily removed and replaced; second, in the arrangement, upon the respective bows, at a point above the connection of the spring to the bows, of a guide, wholly or partially surrounding the said spring, but so as to allow the spring perfect freedom in the said guide.

To enable others to construct my improvement, I will proceed to describe the same as illustrated in the accompanying drawing.

A A are the respective bows to the two glasses; B, the spring, which is a continuous piece of steel from the point of connection, D, on one bow over to the same point on the other bow. Each of the said bows is united at the point D, and so that the two ends may be separable at that point, and so that by uniting the two ends at that point around the glass, the glass will be held into its bow in the usual manner. At the point D, a sufficient space is left between the two ears, by which the bow is connected, to receive the end of the spring B, and through the ears and spring a screw, or equivalent, is placed, which draws the two ears hard down upon the spring, and so as to securely hold its end. Upon each of the two bows, at the point E, above the point D, I form or attach guides, as seen at E, wholly or partially surrounding the spring, but so as to leave the spring perfectly free within the said guides. This leaves the spring free from one end to the other, and thus the entire elasticity of the spring is secured, and so light that the glasses may be worn without the slightest discomfort to the wearer.

By this construction, the elasticity of the entire length of the spring renders the spring less liable to break than when the spring is rigidly connected to the bows at the point E, as in glasses of common construction. Thus, while giving to the wearer greater comfort, durability is added to the glasses.

Upon the spring, at or near each end, I fix pieces of horn, shell, hard rubber, or other suitable material, sufficient to cover the inner surface of the spring at its bearings upon the nose. The two glasses are closed, the one upon the other, and applied to the nose in the usual manner.

Having thus fully described this invention, what I claim as the invention of GEORGE N. CUMMINGS, and desire to secure by Letters Patent, is—

1. The continuous spring B, combined with the two glasses A A, when attached and secured to each of the bows, at or near the point D, in the manner substantially as herein set forth.

2. The arrangement of the guides E E upon each of the bows, and so as to wholly or partially surround the spring, at a point above the point D, and so as to leave the spring free in the said guides, substantially as and for the purpose specified.

CHAS. PARKER,
*Assignee of George N. Cummings.*

Witnesses:
JOHN W. MILES,
ALMIRA MILES.